Jan. 12, 1971   R. W. HECKER, JR., ET AL   3,553,756

DOCKBOARD

Filed Jan. 28, 1969

INVENTORS
Robert W. Hecker, Jr. &
BY Robert C. Beckwith
Bernard, McGlynn & Reising
ATTORNEYS

United States Patent Office 3,553,756
Patented Jan. 12, 1971

3,553,756
DOCKBOARD
Robert W. Hecker, Jr., Clare, Mich., and Robert C. Beckwith, Milwaukee, Wis., assignors to Loomis Machine Company, Clare, Mich., a corporation of Michigan
Filed Jan. 28, 1969, Ser. No. 794,712
Int. Cl. B65g 11/00
U.S. Cl. 14—71                                12 Claims

ABSTRACT OF THE DISCLOSURE

A dockboard assembly including a support means with a ramp pivotally connected to the support means and a lip pivotally connected to the ramp for movement between a pendent position and an extended position to form an extension of the ramp. A chain is connected at one end to the lip and is connected at the other end to a manually graspable handle, both of which are connected to a cable which retracts the chain and handle to a non-use position. The cable is either attached to a retriever reel or a weight.

---

This invention relates to a dockboard assembly of the type including a ramp pivotally connected to a support means with a lip pivotally connected to the ramp. Such assemblies normally have a non-use or storage position where the ramp is generally horizontal and the lip is in a generally vertical pendent position. In use, the lip and ramp are pivoted so that the lip rests upon a vehicle adjacent the dock, such as the bed of a truck, so as to be in a cross traffic position allowing the flow of traffic between the adjacent vehicle and the dock. Various systems have been utilized and are known in the prior art for moving the ramp and lip from the stored position to the cross traffic position and although these systems work very satisfactorily in certain environments, there is a need for a very simple system for use with a dockboard of the type wherein the ramp and lip are manually from the stored position to the cross traffic position.

Accordingly, it is an object and feature of this invention to provide a dockboard assembly including a manually operable means for moving the lip and ramp to the cross traffic position including a flexible force transmitting member connected to the lip at a first end thereof and connected to a manually graspable member at the second end thereof with a retraction means connected to the force transmitting member for moving the latter to a non-use position.

Other objects and attendant advantages of the present invention will be readily appreciated as the same becomes better understood by reference to the following detailed description when considered in connection with the accompanying drawings wherein.

Figure 1:
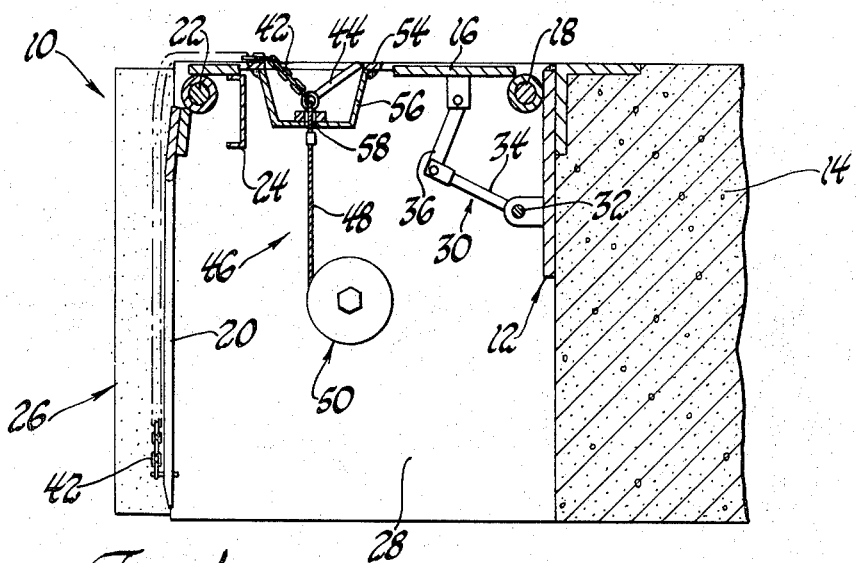
FIG. 1 is a fragmentary cross sectional view of a preferred embodiment of the instant invention showing the dockboard assembly in the stored or non-use position.

Referring now to the drawings wherein like numerals indicate like or corresponding parts throughout the several views, a dockboard assembly constructed in accordance with the instant invention is generally shown at 10 and 10'.

The dockboard assembly includes a support means generally indicated at 12 and shown attached to the front wall of a concrete dock 14.

Figure 2:
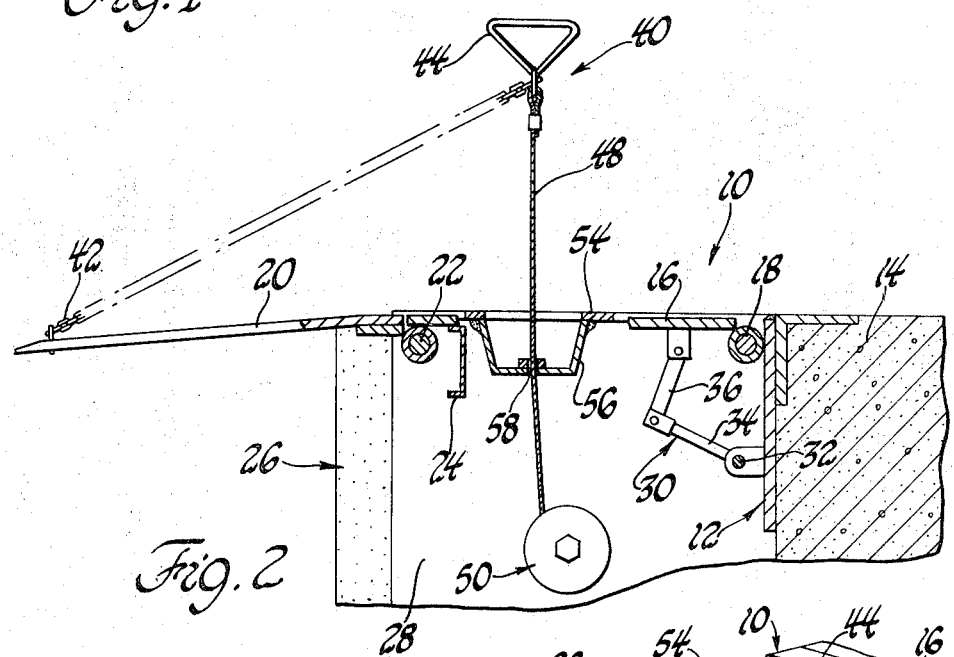
FIG. 2 is a fragmentary cross sectional view similar to FIG. 1 but showing the dockboard assembly being manually moved to the cross traffic position.
Figure 4:
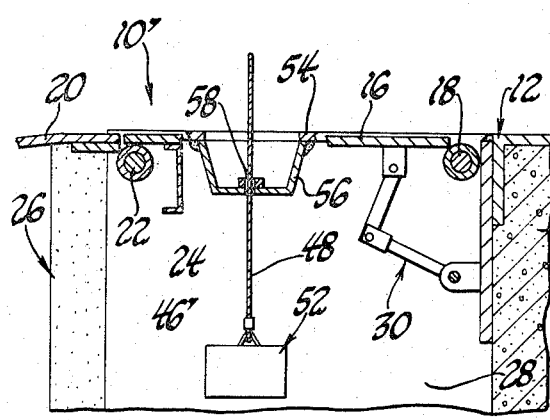
FIG. 4 is a fragmentary cross sectional view similar to FIG. 2 but showing an alternative embodiment of the instant invention.
Figure 3:
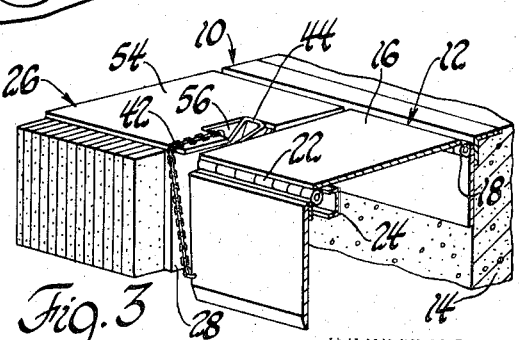
FIG. 3 is a fragmentary perspective view of the preferred embodiment of the instant invention.

There is also included a ramp 16 which is pivotally connected to the support means 12 through a piano-type hinge 18. Also included is a lip 20 pivotally connected to the ramp through a second piano-type hinge 22 for movement relative to the ramp 16 between a pendent position, as illustrated in FIGS. 1 and 3, and an extended position to provide an extension of the ramp 16, as illustrated in FIGS. 2 and 4. There is also included means comprising the cross beam 24 for supporting the ramp 16 and the lip 20 in the stored position where the ramp is generally horizontal and the lip is generally vertical and in the pendent position as illustrated in FIGS. 1 and 3. The assembly also includes bumper means generally indicated at 26 and disposed at each end of the ramp 16 for preventing a vehicle from contacting the ramp and the lip when in the stored position. The bumper means 26 are secured to the support means 12 and include the plates 28. The cross beam 24 extends between the plates 28 of the bumper means 26.

There is also included a torsion means generally indicated at 30 interconnecting the support means 12 and the ramp 16 for urging the ramp 16 to pivot upwardly. The torsion means 30, therefore, assists in the manual raising of the ramp 16 and the lip 20 to the cross traffic position. The torsion means 20 may take various forms but as shown includes a torsion bar having an elongated portion 32 extending along the support means 12 and a right angle crank portion 34 which is connected through a link 36 to the ramp 16. The elongated portion 32 is twisted or in torsion when the ramp 16 is in a lowered position and, therefore, the crank portion 34 urges the ramp to pivot upwardly.

The dockboard assembly also includes a manually operable means generally indicated at 40 in FIG. 2 connected to the lip 20 to pivot the lip from the pendent position to the extended position and for retracting to a non-use position. The manually operable means 40 includes a flexible force transmitting member comprising a chain 42 which is connected at a first end thereof to the lip 20 and connected to a manually graspable member or handle 44 at the second end thereof. The chain collapses when subjected to compression along its length or longitudinal axis. The manually operable member 40 also includes a retraction means, which is generally indicated at 46 and 46' in FIGS. 1 and 4, respectively, and connected to the chain 42 for moving the latter to the non-use position illustrated in FIG. 1. The retraction means comprises a flexible element defined by the cable 48 which has first and second ends with the first end thereof connected to the chain 42 and the handle 44. The retraction means also includes an energy means generally indicated at 50 in FIG. 1 and 52 in FIG. 4. The energy means 50 and 52, respectively, are connected to the second end of the cable 48 for moving the cable 48 in a direction causing slack to be taken up in the chain 42.

The energy means 50 comprises a retriever reel rotatably supported by the plate 28 of the bumper means and biased to rotate as by a spring in one direction for winding the cable 48 thereon to move the handle 44 toward the non-use position.

The energy means 52, forming the alternative embodiment shown in FIG. 4, comprises a weight which is free to fall beneath the dockboard assembly to move the handle 44 to the non-use position.

The bumper means 26 includes an upper plate 54 which is supported by the support means 12 and includes a pocket 56 for receiving the handle 44 in the non-use position. The pocket 56 has an opening 58 in the bottom thereof through which the flexible cable 48 extends.

When it is desirable to move the dockboard assembly from the stored position, illustrated in FIG. 1, to the cross traffic position, illustrated in FIG. 2, the handle 44 is manually grasped whereby the lip 20 is rotated to the extended cantilevered position with its rear end in abutting engagement with the front end of the ramp 16 so that upon further upward lifting movement, both the lip 20 and the ramp 16 will pivot upwardly to a position high enough so that both the ramp and lip may be lowered to rest the lip 20 upon an adjacent vehicle. Once the lip 20 rests upon an adjacent vehicle, the handle 44 is released and will be moved into the pocket 56 by the force applied to the cable 48 by the reel means 50 or, alternatively, by the weight 52.

The invention has been described in an illustrative manner and it is to be understood that the terminology which has been used is intended to be in the nature of words of description rather than of limitation.

Obviously, many modifications and variations of the present invention are possible in light of the above teachings. It is therefore, to be understood that within the scope of the appended claims, the invention may be practiced otherwise than as specifically described.

The embodiments of the invention in which an exclusive property or privilege is claimed are defined as follows:

1. A dockboard assembly comprising: support means; a ramp pivotally connected to said support means; a lip pivotally connected to said ramp for movement relative thereto betwen a pendent position and an extended position to provide an extension of said ramp; and manually operable means connected to said lip to pivot the latter from said pendent position to said extended position and for retracting to a non-use position, said manually operable means including a flexible tension transmitting member which collapses when subjected to compression in a direction along its length, a manually graspable member, sand tension transmitting member being connected to said lip at a first end thereof at a position on said lip spaced from the pivotal connection of said lip to said ramp and connected to said manually graspable member so that said manually graspable member may be moved to place said transmitting member under tension to pivot said lip, and retraction means operably connected to said tension transmitting member for moving the latter and said manually graspable member to said non-use position.

2. An assembly as set forth in claim 1 wherein said retraction means includes a weight.

3. An assembly as set forth in claim 1 including means for supporting said ramp and said lip in a stored position where said ramp is generally horizontal and said lip is generally vertical and in said pendent position.

4. An assembly as set forth in claim 3 wherein said retraction means includes a flexible element having first and second ends with said first end thereof connected to said force transmitting member, and energy means connected to said second end of said flexible element for moving the latter in a direction causing slack to be taken up in said force transmitting member.

5. An assembly as set forth in claim 4 wherein said energy means comprises retriever reel means biased to rotate in one direction for winding said flexible element thereon.

6. An assembly as set forth in claim 4 wherein said energy means comprises a weight.

7. An assembly as set forth in claim 4 including a pocket supported by said support means for receiving said manually graspable member in said non-use position.

8. An assembly as set forth in claim 7 wherein said pocket has an opening therein through which said flexible element extends.

9. An assembly as set forth in claim 8 including bumper means disposed at each end of said ramp for preventing a vehicle from contacting said ramp and said lip when in said stored position, and torsion means interconnecting said support means and said ramp urging said ramp to pivot upwardly thereby assisting the manual raising of said ramp and said lip.

10. An assembly as set forth in claim 9 wherein said force transmitting member is a chain and said flexible element is a cable.

11. An assembly as set forth in claim 9 wherein said energy means comprises retriever reel means connected to said bumper means and biased to rotate in one direction for winding said flexible element thereon to move said manual graspable means into said pocket.

12. An assembly as set forth in claim 9 wherein said energy means comprises a weight.

References Cited

UNITED STATES PATENTS

| | | | |
|---|---|---|---|
| 2,974,336 | 3/1961 | Kelley | 14—71 |
| 3,006,008 | 10/1961 | Loomis | 14—71 |
| 3,323,158 | 6/1967 | Loomis | 14—71 |
| 3,460,175 | 8/1969 | Beckwith | 14—71 |

NILE C. BYERS, JR., Primary Examiner